United States Patent
Wang et al.

(10) Patent No.: US 9,124,332 B2
(45) Date of Patent: Sep. 1, 2015

(54) METHOD, APPARATUS, AND SYSTEM FOR INTERFERENCE ALIGNMENT

(71) Applicant: Huawei Technologies Co., Ltd., Shenzhen, Guangdong (CN)

(72) Inventors: Rui Wang, Shenzhen (CN); Yinggang Du, Kista (SE); Hong Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/286,011

(22) Filed: May 23, 2014

(65) Prior Publication Data

US 2014/0254707 A1     Sep. 11, 2014

Related U.S. Application Data

(63) Continuation of application No. PCT/CN2012/084925, filed on Nov. 21, 2012.

(30) Foreign Application Priority Data

Nov. 25, 2011    (CN) .......................... 2011 1 0382521

(51) Int. Cl.
*H04L 1/00*        (2006.01)
*H04B 7/08*        (2006.01)
(Continued)

(52) U.S. Cl.
CPC ............ *H04B 7/0837* (2013.01); *H04B 7/0613* (2013.01); *H04L 25/03891* (2013.01); *H04L 25/08* (2013.01); *H04L 27/3488* (2013.01); *H04L 2025/0342* (2013.01)

(58) Field of Classification Search
CPC ... H04L 27/2647; H04B 1/1027; H04B 1/123
USPC .......... 375/346, 267, 296, 285; 370/334, 345; 455/450, 454, 455
See application file for complete search history.

(56) References Cited

U.S. PATENT DOCUMENTS 8,379,705 B2 *    2/2013    Mallik et al. .................. 375/226
8,462,873 B2 *    6/2013    Park et al. ..................... 375/285
(Continued)

FOREIGN PATENT DOCUMENTS

CN          101572653 A        11/2009
WO    WO 2007/123366 A2      11/2007

OTHER PUBLICATIONS

Guy Bresler, et al., "The Approximate Capacity of the Many-to-One and One-to-Many Gaussian Interference Channels", IEEE Transactions on Information Theory, vol. 56, No. 9, Sep. 2010, p. 4566-4592.

(Continued)

*Primary Examiner* — Khai Tran

(57) ABSTRACT

Embodiments of the present invention provide a method, an apparatus, and a system for interference alignment. The method includes: receiving signals transmitted by transmit ends, where the signals include interference signals and a wanted signal; aligning original constellation diagrams of the interference signals to acquire a first interference aligned constellation diagram; performing, according to the first interference aligned constellation diagram, interference signal demodulation and decoding on the received signals to acquire an interference source bit sequence; performing, according to the interference source bit sequence and the first interference aligned constellation diagram, interference reconstruction and removal to acquire a second interference aligned constellation diagram; and performing, according to the second interference aligned constellation diagram, wanted signal demodulation and decoding on the signal sequence to acquire the wanted signal transmitted by a wanted signal transmit end. The embodiments of the present invention are applicable to radio communications.

14 Claims, 7 Drawing Sheets

(51) Int. Cl.
  *H04B 7/06* (2006.01)
  *H04L 25/08* (2006.01)
  *H04L 27/34* (2006.01)
  *H04L 25/03* (2006.01)

(56) References Cited

U.S. PATENT DOCUMENTS 8,755,412 B2 * 6/2014 Ho et al. .................. 370/527

2010/0248712 A1 9/2010 Lee et al.
2011/0051837 A1 3/2011 Park et al.
2011/0206106 A1 8/2011 Mallik et al.
2011/0222462 A1 9/2011 Ho et al.

OTHER PUBLICATIONS

Or Ordentlich, et al.,"Interference Alignment at Finite SNR for Time-Invariant Channels", 2011 IEEE Information Theory Workshop, p. 442-446.

* cited by examiner

METHOD, APPARATUS, AND SYSTEM FOR INTERFERENCE ALIGNMENT

CROSS-REFERENCE TO RELATED APPLICATIONS

This application is a continuation of International Application No. PCT/CN2012/084925, filed on Nov. 21, 2012, which claims priority to Chinese Patent Application No. 201110382521.4, filed on Nov. 25, 2011, both of which are hereby incorporated by reference in their entireties.

TECHNICAL FIELD

The present invention relates to the field of radio communications technologies, and in particular, to a method, an apparatus, and a system for interference alignment.

BACKGROUND

A broadcast feature of nodes in a radio network communications system inevitably causes co-channel interference to signals simultaneously transmitted in a same frequency band. Introduction of a multi-antenna system greatly increases difficulty and complexity of an anti-interference algorithm. In a future radio communications system, channel interference may be a main bottleneck that restricts system performance.

An interference alignment method is a new method for processing co-channel interference. In the prior art, a transmit end converts information to a signal to be transmitted by performing two steps: channel encoding and modulation, and a receive end aligns an interference signal and then directly maps the interference signal to the signal to be transmitted which greatly increases complexity of signal demodulation and decoding at the receive end.

SUMMARY

Embodiments of the present invention provide a method, an apparatus, and a system for interference alignment to reduce complexity of signal encoding and decoding at a signal receive end while removing interference.

To achieve the foregoing objective, the embodiments of the present invention adopt the following technical solutions:

In one aspect, an interference alignment method is provided and includes:

receiving signals transmitted by transmit ends, where the signals include interference signals and a wanted signal;

aligning original constellation diagrams corresponding to the multiple interference signals transmitted by interference signal transmit ends, to acquire a first interference aligned constellation diagram, where the multiple interference signals use same channel encoding and a same modulation scheme;

performing, according to the first interference aligned constellation diagram, interference signal demodulation on the received signals to acquire an interference code bit sequence;

decoding the interference code bit sequence to acquire an interference source bit sequence;

performing, according to the interference source bit sequence and the first interference aligned constellation diagram, interference reconstruction and removal to acquire a second interference aligned constellation diagram; and performing, according to the second interference aligned constellation diagram, wanted signal demodulation and decoding on the received signals to acquire the wanted signal transmitted by a wanted signal transmit end.

In one aspect, an interference alignment method is provided and includes:

encoding and modulating, by interference signal transmit ends, interference source bit sequence of a same length by using same channel encoding and a same modulation scheme;

adjusting a transmission parameter of interference signals, so that original constellation diagrams formed for the transmitted interference signals at a signal receive end are consistent; and transmitting the interference signals to the signal receive end.

In one aspect, a signal receive end is provided and includes:

a receive module, configured to receive signals transmitted by transmit ends, where the signals include interference signals and a wanted signal;

an interference demodulation module, configured to align original constellation diagrams corresponding to the interference signals to generate a first interference aligned constellation diagram, and perform, according to the first interference aligned constellation diagram, interference signal demodulation on a received signal sequence to acquire an interference code bit sequence;

an interference decoding module, configured to decode the interference code bit sequence to acquire an interference source bit sequence;

an interference reconstruction, removal, and wanted signal demodulation module, configured to perform, according to the interference source bit sequence and the first interference aligned constellation diagram, interference reconstruction and removal to acquire a second interference aligned constellation diagram, and perform, according to the second interference aligned constellation diagram, wanted signal demodulation on the received signals; and a wanted signal decoding module, configured to decode the demodulated wanted signal to acquire the wanted signal transmitted by a wanted signal transmit end.

In one aspect, an interference signal transmit end is provided and includes:

an interference encoding module, configured to encode interference source bit sequence of a same length to acquire interference signal code bit sequences;

an interference modulation module, configured to modulate the interference signal code bit sequences of a same length to generate interference signals;

a transmission parameter adjusting module, configured to adjust a transmission parameter of the interference signals, so that original constellation diagrams formed for the interference signals at a receive end are consistent; and a sending module, configured to send the interference signals with the transmission parameter adjusted to the signal receive end.

In one aspect, an interference alignment system is provided and includes:

a signal receive end, configured to align all received interference signals, and then demodulate, decode, and remove the interference signals to acquire a wanted signal;

at least two interference signal transmit ends, configured to generate interference signals by using same channel encoding and a same modulation scheme, and transmit the interference signals to the signal receive end; and a wanted signal transmit end, configured to generate the wanted signal and transit the wanted signal to the signal receive end.

According to the interference alignment method, apparatus, and system provided by embodiments of the present invention, interference signals are demodulated and decoded step by step after being aligned, so that the interference signals are removed. Compared with the prior art where interference signals are aligned and then directly mapped to an interference source bit sequence, this reduces the complexity of signal demodulation and decoding at the receive end.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An interference signal and a wanted signal in the embodiments of the present invention are relative to different receive ends. For example, a certain signal is an interference signal to a receive end in the embodiments of the present invention but is a wanted signal to a receive end of the signal.

Figure 1:
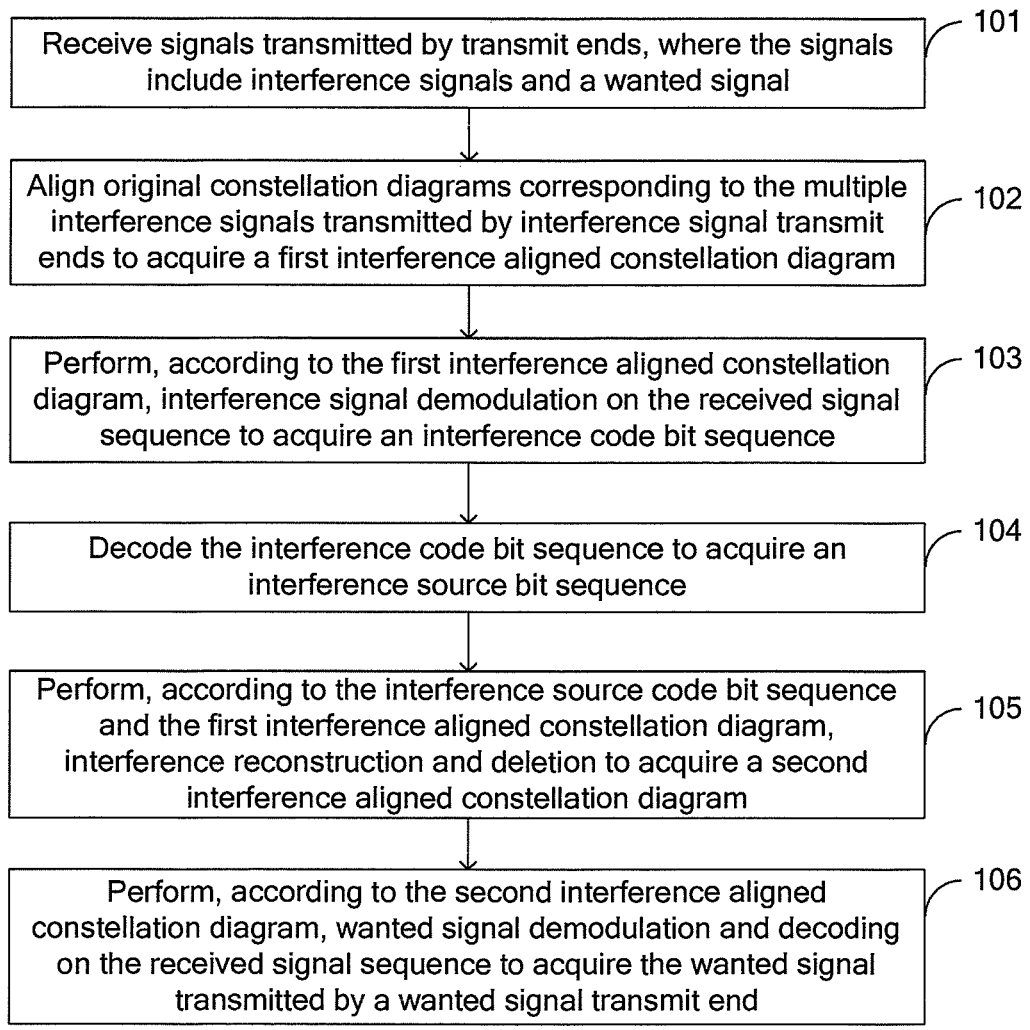
FIG. 1 is a flowchart of an interference alignment method provided by an embodiment of the present invention.

An interference alignment method provided by an embodiment of the present invention, as shown in FIG. 1, includes the following steps:

101. Receive signals transmitted by transmit ends, where the signals include interference signals and a wanted signal.

102. Align original constellation diagrams corresponding to the multiple interference signals transmitted by interference signal transmit ends, to acquire a first interference aligned constellation diagram.

103. Perform, according to the first interference aligned constellation diagram, interference signal demodulation on the received signals to acquire an interference code bit sequence.

104. Decode the interference code bit sequence to acquire an interference source bit sequence.

105. Perform, according to the interference source bit sequence and the first interference aligned constellation diagram, interference reconstruction and removal to acquire a second interference aligned constellation diagram.

106. Perform, according to the second interference aligned constellation diagram, wanted signal demodulation and decoding on the received signals to acquire the wanted signal transmitted by a wanted signal transmit end.

According to the interference alignment method provided by the embodiment of the present invention, interference signals are demodulated and decoded step by step after being aligned, so that the interference signals are removed. Compared with the prior art where interference signals are aligned and then directly mapped to an interference source bit sequence, this reduces the complexity of signal demodulation and decoding at the receive end.

Figure 2:
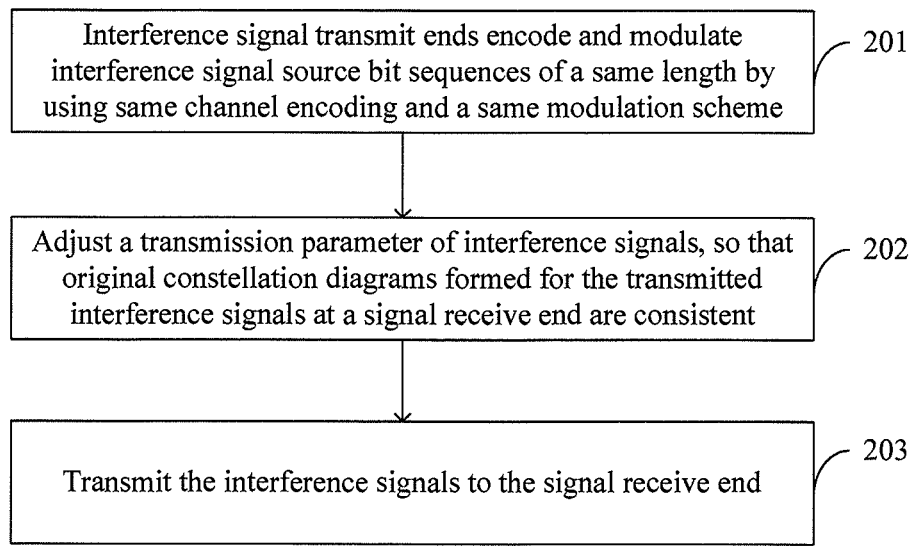
FIG. 2 is a flowchart of an interference alignment method provided by another embodiment of the present invention.

An interference alignment method provided by another embodiment of the present invention, as shown in FIG. 2, includes the following steps:

201. Interference signal transmit ends encode and modulate interference source bit sequence of a same length by using same channel encoding and a same modulation scheme.

202. Adjust a transmission parameter of interference signals, so that original constellation diagrams formed for the transmitted interference signals at a signal receive end are consistent.

203. Transmit the interference signals to the signal receive end.

According to the interference alignment method provided by the embodiment of the present invention, multiple interference signals are encoded and modulated by using same channel encoding and a same modulation scheme and then a transmission parameter is adjusted to make original constellation diagrams formed for the interference signals at a receive end completely consistent, so as to implement alignment of the interference signals at the receive end, and thereby the interference signals are demodulated and decoded step by step and then removed.

Figure 3:
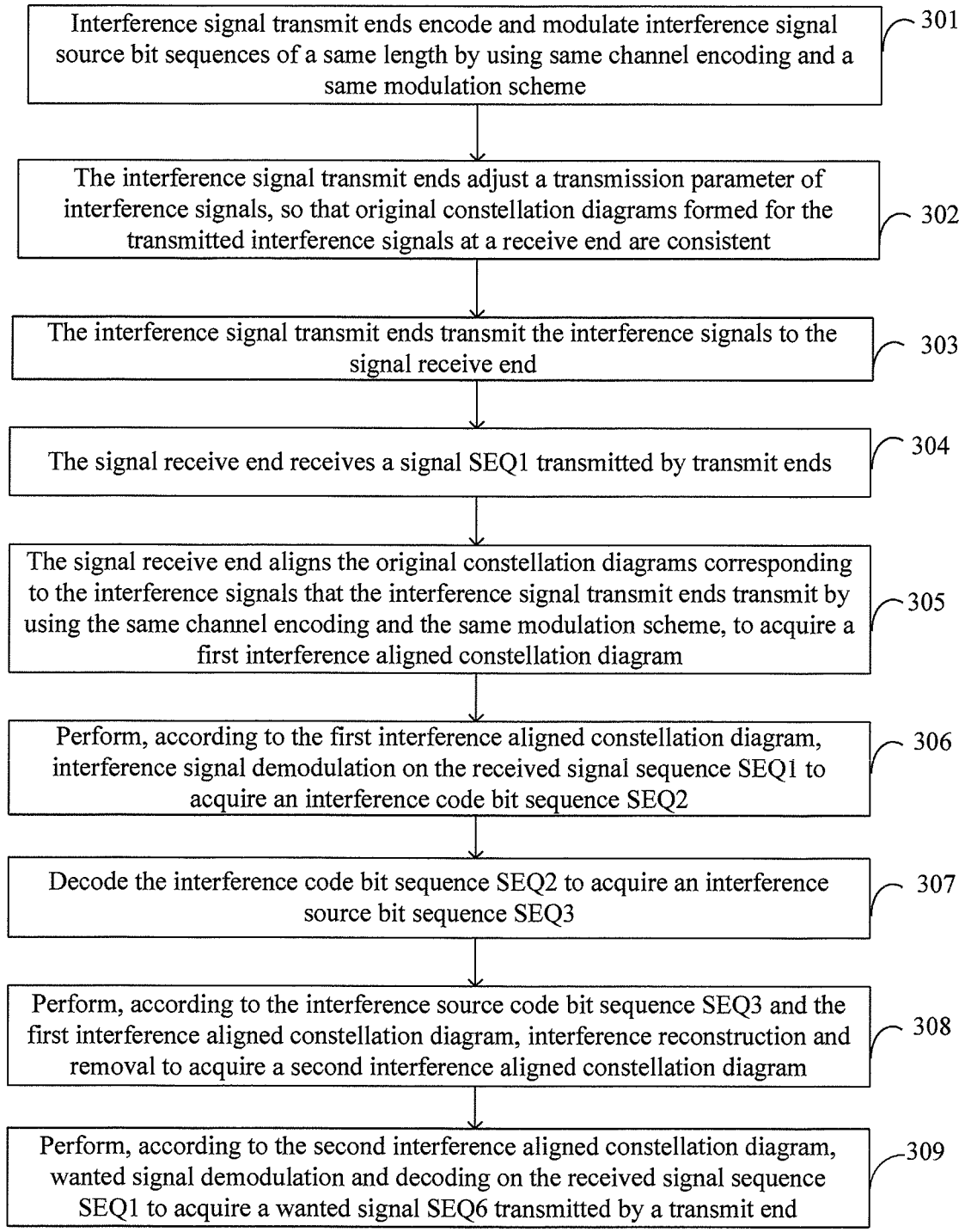
FIG. 3 is a flowchart of an interference alignment method provided by still another embodiment of the present invention.

An interference alignment method provided by still another embodiment of the present invention, as shown in FIG. 3, includes the following steps:

301. Interference signal transmit ends encode and modulate interference source bit sequence of a same length by using same channel encoding and a same modulation scheme.

Specifically, the interference signal transmit ends encode and modulate the interference source bit sequence of the same length by using a Channel Encoder 1 meeting a predefined condition and the same modulation scheme.

The predefined condition is as follows:

If binary code bit steams generated after two binary signal source bit streams a1, a2, a3, . . . , aM and b1, b2, b3, . . . , bM are processed by using the Channel Encoder 1 are respectively p1, p2, p3, . . . , pN and q1, q2, q3, . . . , qN, a binary code bit stream generated after a binary source bit stream a1⊕b1, a2⊕b2, a3⊕b3, . . . , aM⊕bM is processed by using the Channel Encoder 1 is p1⊕q1, p2⊕q2, p3⊕q3, . . . , pM⊕qM, where, ⊕ indicates a binary exclusive-OR operation. The Channel Encoder 1 meeting the foregoing predefined condition includes: Convolutional Code, Turbo Code, LDPC, Repetton Code, and the like. A channel encoding scheme emerges after the present invention, if meeting the predefined condition, can also be used as the Channel Encoder 1.

The modulation scheme in the embodiment of the present invention includes all M-QAM modulation schemes such as BPSK, QPSK (4QAM), 8QAM, 16QAM, 64QAM, and the like.

302. The interference signal transmit ends adjust a transmission parameter of interference signals, so that original constellation diagrams formed for the transmitted interference signals at a receive end are consistent.

Specifically, the interference signal transmit ends make, by rotating a transmit channel, the interference signals have a same phase and same power. In this way, original constellation points in the original constellation diagrams of the interference signals have a consistent arrangement direction and a consistent arrangement distance, which means that the original constellation diagrams are consistent.

303. The interference signal transmit ends transmit the interference signals to the signal receive end.

304. The signal receive end receives a signal SEQ1 transmitted by transmit ends.

Specifically, the signal receive end receives the interference signals transmitted by the interference signal transmit ends and a wanted signal transmitted by a wanted signal transmit end. The interference signals and the wanted signal are marked as a signal sequence SEQ1.

305. The signal receive end aligns the original constellation diagrams corresponding to the interference signals that the interference signal transmit ends transmit by using the same channel encoding and the same modulation scheme, to acquire a first interference aligned constellation diagram.

Specifically, the signal receive end performs vector addition on original constellation points in the original constellation diagrams corresponding to the interference signals to acquire aligned constellation points, and determines bit mapping for the aligned constellation points to acquire the first interference aligned constellation diagram.

Here, according to the modulation scheme used by the interference signal transmit ends, the bit mapping of the aligned constellation points may be initial bit mapping, where the initial bit mapping means that a bit of an aligned constellation point is an exclusive-OR bit of a bit of an original constellation point from which the aligned constellation point is generated; or the bit mapping may be final bit mapping, where the final bit mapping means that initial bit mapping C1, C2, . . . , CN is acquired by performing an exclusive-OR operation on bits of original constellation points corresponding to N different combination modes of the original constellation points from which the same aligned constellation point is generated. Then, the bit mapping of the constellation point is to average the N types of initial bit mapping by bit, that is, C=(C1+C2+ . . . +CN)/N, where, "+" means adding up values on corresponding bits in the N types of initial bit mapping C1, C2, . . . , CN to acquire a sum value on the corresponding bits and "/N" means dividing the sum value on the bits by N.

Specifically, when the modulation scheme used by the interference signal transmit ends makes initial bit mapping of the aligned constellation points unique, for example, when the interference signal transmit ends use BPSK or QPSK as the interference signal modulation scheme, the aligned constellation points adopt the initial bit mapping.

Figure 4:
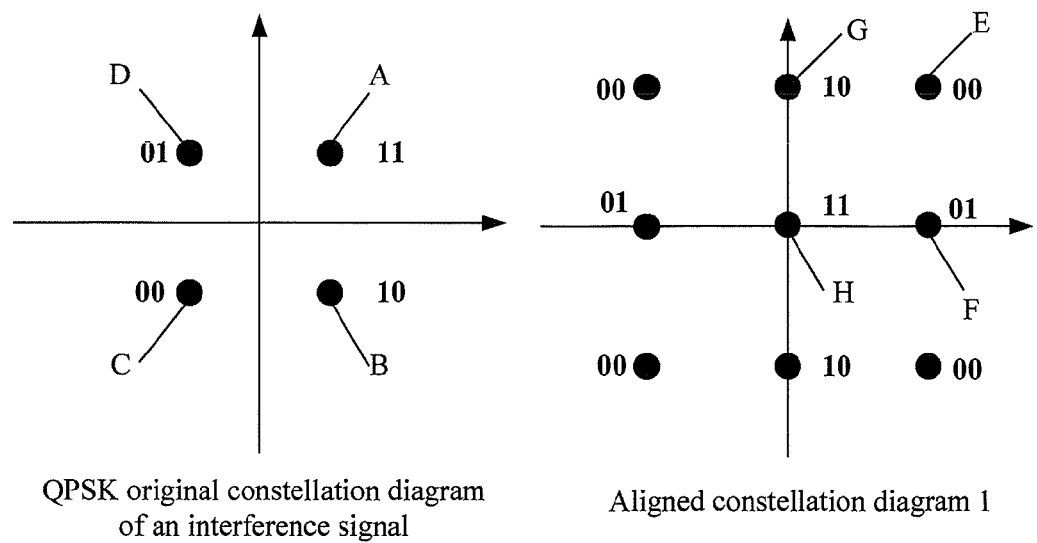
FIG. 4 is a schematic diagram illustrating generation of alignment constellation diagram 1 according to an embodiment of the present invention.

Two interference signal transmit ends are used as an example. When the modulation scheme used by the interference signal transmit ends is QPSK, the interference signal transmit ends make, by rotating a transmit channel, an arrangement direction of original constellation points in QPSK original constellation diagrams of interference signals consistent with a coordinate axis. An arrangement distance of the original constellation points is two unit distances. As shown in FIG. 4, a QPSK original constellation diagram of an interference signal contains four original constellation points. FIG. 4 marks bits corresponding to each original constellation point. Vector addition is performed on original constellation point A with coordinates (1, 1) in one QPSK original constellation diagram and four original constellation points (coordinates are (1, 1), (1, −1), (−1, 1), and (−1, −1) respectively) in another QPSK original constellation diagram to acquire four aligned constellation points with coordinates E (2, 2), F(2, 0), G(0, 2), and H(0, 0) respectively. Therefore, bits of the four aligned constellation points are an exclusive-OR result of bits of the original constellation points from which the four aligned constellation points are generated. That is to say, bits of the constellation point E(2, 2) is [1⊕1 1⊕1]=[00], bits of the constellation point F(2, 0) is [1⊕1 1⊕0]=[01], bits of the constellation point G(0, 2) is [1⊕0 1⊕1]=[10], and bits of the constellation point H(0, 0) is [1⊕0 1⊕0]=[11]. Other aligned constellation points are generated in the same way, which is not repeatedly described herein. Vector addition is performed on original constellation points in one interference original constellation diagram and original constellation points in another interference original constellation diagram to acquire all aligned constellation points, and bits of the aligned constellation points are determined according to the initial bit mapping. In this way, the first interference aligned constellation diagram is acquired. When the number of interference sources is greater than 2, composition of the first interference aligned constellation diagram is deduced by analogy. It should be noted that the aligned constellation points in the first interference aligned constellation diagram may be acquired by performing vector addition on different combinations of original constellation points in the interference original constellation diagram. For example, in FIG. 4, an aligned constellation point H with a coordinate point (0, 0) in the interference aligned constellation diagram may be acquired by performing vector addition on an original constellation point A with a coordinate point (1, 1) and bits [11] in one QPSK original constellation diagram and an original constellation point C with a coordinate point (−1, −1) and bits [00] in another QPSK original constellation diagram, or by performing vector addition on an original constellation point D with a coordinate point (−1, 1) and bits [01] in one QPSK original constellation diagram and an original constellation point B with a coordinate point (1, −1) and bits [10] in another QPSK original constellation diagram. Therefore, the bits of the aligned constellation point H are an exclusive-OR result of the bits of the original constellation points A and C, that is, [1⊕01⊕0]=[11]. The bits of the aligned constellation point H are also an exclusive-OR result of the bits of the original constellation points C and D, that is, [0⊕11⊕0]=[11]. In this way, although the aligned constellation point H is generated by performing vector addition on different combinations of original constellation points, the bits determined for the aligned constellation point H through initial bit mapping are unique.

When the modulation scheme used by the interference signal transmit ends makes bit mapping of the aligned constellation points not unique, for example, when the interference signal transmit ends use an M-QAM modulation scheme other than BPSK and QPSK, such as 8QAM, 16QAM, or 64QAM, as the interference signal modulation scheme, the aligned constellation points adopt the final bit mapping.

Figure 5:
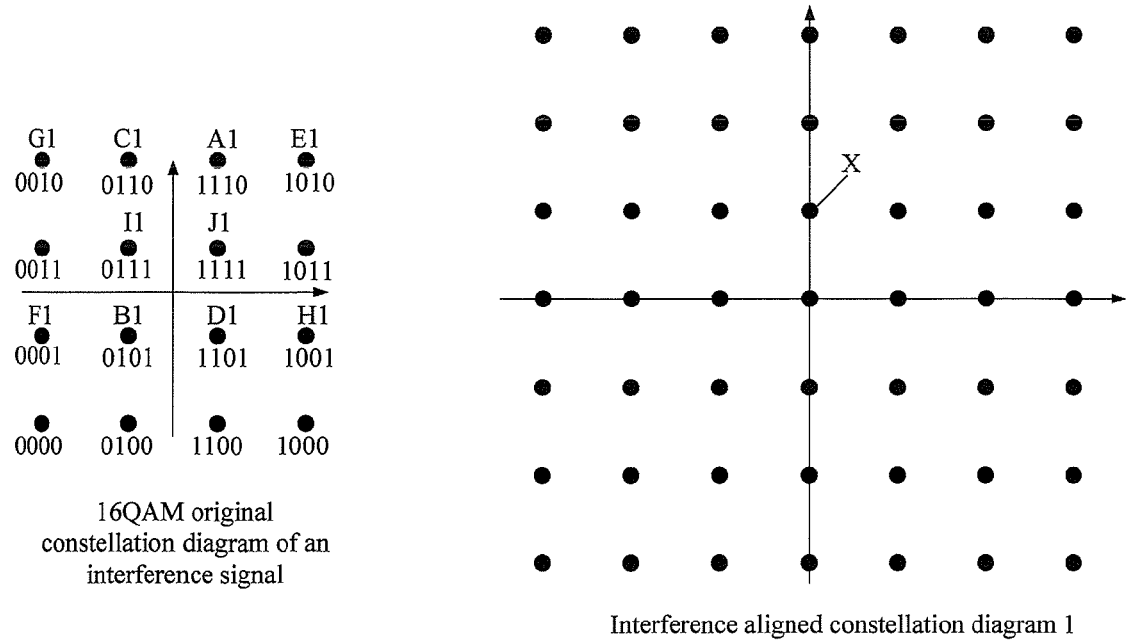
FIG. 5 is another schematic diagram illustrating generation of alignment constellation diagram 1 according to an embodiment of the present invention.

Two interference signal transmit ends are used as an example. When the modulation scheme used by the interference signal transmit ends is 16QAM, the interference signal transmit ends make, by rotating the transmit channel, arrangement directions of original constellation points in 16QAM original constellation diagrams of the interference signals consistent with a coordinate axis. The arrangement distance of the original constellation points is two unit distances. As shown in FIG. 5, a 16QAM original constellation diagram of an interference signal contains 16 original constellation points. FIG. 5 marks bits corresponding to each original constellation point. Vector addition is performed on original constellation points in 16QAM original constellation diagrams of two interference signals to acquire aligned constellation points. When an aligned constellation point is acquired by performing vector addition on N different combinations of original constellation points in the interference original constellation diagrams, an exclusive-OR operation is performed on the bits of the original constellation points corresponding to each combination mode of the original constellation points to acquire N types of initial bit mapping. The N types of initial bit mapping are not unique.

As shown in FIG. 5, combination modes for generating a same aligned constellation point X with a coordinate point (0, 2i) in the interference aligned constellation diagram may be vector addition modes of five combinations: vector addition of an original constellation point A1 (a coordinate point is (1, 3) and bits are [1 1 1 0]) and an original constellation point B1 (a coordinate point is (−1, −1) and bits are [0 1 0 1]); vector addition of an original constellation point C1 (a coordinate point is (−1, 3) and bits are [0 1 1 0]) and an original constellation point D1 (a coordinate point is (1, −1) and bits are [1 1 0 1]); vector addition of an original constellation point E1 (a coordinate point is (3, 3) and bits are [1 0 1 0]) and an original constellation point F1 (a coordinate point is (−3, −1) and bits are [0 0 0 1]); vector addition of an original constellation point G1 (a coordinate point is (−3, 3) and bits are [0 0 1 0]) and an original constellation point H1 (a coordinate point is (3, −1) and bits are [1 0 0 1]); and vector addition of an original constellation point I1 (a coordinate point is (−1, 1) and bits are [0 1 1 1]) and an original constellation point J1 (a coordinate point is (1, 1) and bits are [1 1 1 1]. Corresponding initial bit mapping is C1=C2=C3=C4=[1 0 1 1] and C5=[1 0 0 0]. Therefore, bit mapping of the aligned constellation point X is acquired by averaging the initial bit mapping corresponding to these five combination modes by bit, that is, CX=[(1+1+1+1+1)/5 (0+0+0+0+0)/5 (1+1+1+1+0)/5 (1+1+1+1+0)/5] =[1 0 0.8 0.8]. When the number of interference sources is greater than 2, a composition of the first interference aligned constellation diagram is deduced by analogy.

306. Perform, according to the first interference aligned constellation diagram, interference signal demodulation on the received signals SEQ1 to acquire an interference code bit sequence SEQ2.

Step 306 may be implemented in the following two manners:

Manner 1: The received signals SEQ1 is demodulated according to the first interference aligned constellation diagram to acquire the interference code bit sequence SEQ2.

Specifically, in the first interference aligned constellation diagram, constellation points nearest to coordinates corresponding to signals in the signal sequence SEQ1 are found, and bits corresponding to the constellation points are acquired according to the bit mapping of the first interference aligned constellation diagram. In this way, according to the first interference aligned constellation diagram, the signal sequence SEQ1 is demodulated to acquire the interference code bit sequence SEQ2.

It should be noted that demodulation is classified into two types: hard demodulation and soft demodulation. A binary bit sequence consisting of 0 and 1 is acquired after a hard demodulation. In a bit sequence acquired after a soft demodulation, each bit is expressed by a decimal between 0 and 1. When the decimal is close to 0, a probability that the bit is 0 is large. When the decimal is close to 1, a probability that the bit is 1 is large. In the embodiment, when the interference signal transmit ends adopt BPSK or QPSK as the modulation scheme, either hard demodulation or soft demodulation may be adopted. When the interference signal transmit ends adopt all M-QAM modulation schemes such as 8QAM, 16QAM, 64QAM, and the like, soft demodulation is adopted.

Manner 2: Vector addition is performed on constellation points in an original desired constellation diagram corresponding to the wanted signal transmitted by the wanted signal transmit end and those in the first interference aligned constellation diagram to acquire constellation points; and bit mapping is determined for each constellation point to generate an interference demodulation constellation diagram. The signal sequence SEQ1 is demodulated according to the interference demodulation constellation diagram to acquire the interference code bit sequence SEQ2.

Figure 6:
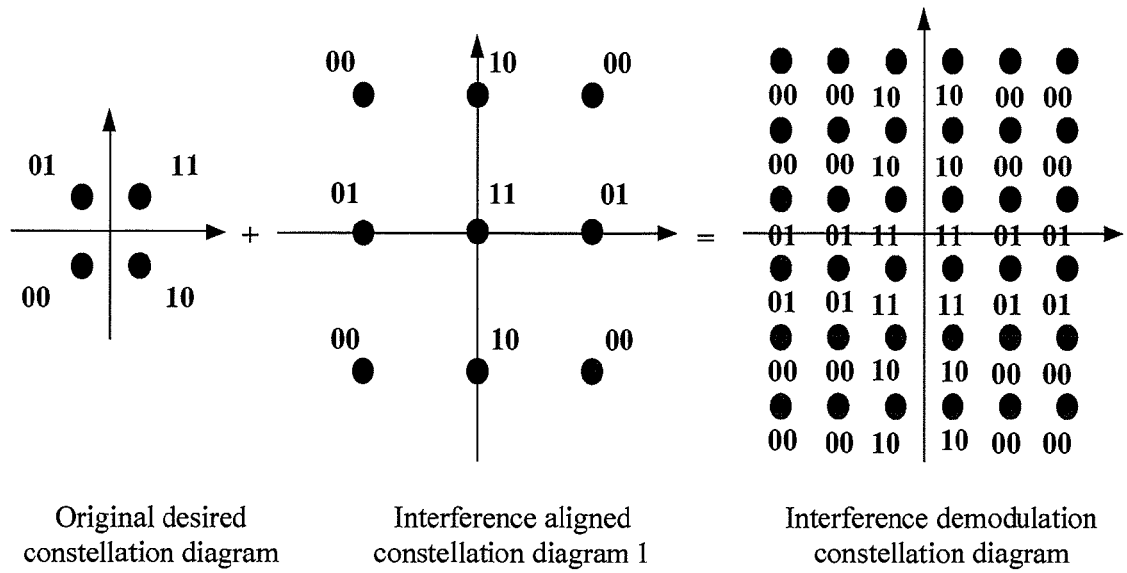
FIG. 6 is a schematic diagram illustrating generation of an interference demodulation constellation diagram according to an embodiment of the present invention.

Specifically, as shown in FIG. 6, vector addition is performed on the constellation points in the original desired constellation diagram corresponding to the wanted signal transmitted by the wanted signal transmit end and those in the first interference aligned constellation diagram to acquire constellation points, and bit mapping is determined for each constellation point to generate the interference demodulation constellation diagram. The vector addition and the bit mapping are the same as the vector addition process and the determination of the bit mapping for generating the first interference aligned constellation diagram, and are not repeatedly described herein.

Bits corresponding to each constellation point in the interference demodulation constellation diagram are the same as bits corresponding to a constellation point in the first interference aligned constellation diagram from which the constellation point is generated. The demodulation process is the same as the demodulation process described in manner 1. A difference is that constellation points in the interference demodulation constellation diagram are denser than those in the interference aligned constellation diagram. Therefore, demodulating the signal sequence SEQ1 according to the interference demodulation constellation diagram is more accurate than demodulating the signal sequence SEQ1 according to the first interference aligned constellation diagram.

307. Decode the interference code bit sequence SEQ2 to acquire an interference source bit sequence SEQ3.

Optionally, if a scrambling operation is performed before an interference signal transmit end demodulates a channel-encoded bit sequence, the signal receive end needs to descramble the SEQ2 first and then input the descrambled SEQ2 to a channel decoder of the ENCODER1 for decoding to acquire the interference source bit sequence SEQ3.

Two interference signal transmit ends are used as an example. If scrambling sequences of the two interference signal transmit ends are [S11 S12 . . . S1N] and [S21 S22 . . . S2N] respectively, a descrambling sequence is an exclusive-OR result of these sequences by bit, that is, [S11⊕S21 S12⊕S22 . . . S1N⊕S2N].

Optionally, if the interference signal transmit ends adopt a same CRC (cyclic redundancy check, Cyclic Redundancy Check) code generation algorithm for the interference signal source bit sequence, the signal receive end may adopt a corresponding check algorithm to perform CRC check and error correction on the decoded interference signal source bit sequence to generate an error-corrected interference signal source bit sequence SEQ3.

308. Perform, according to the interference source bit sequence SEQ3 and the first interference aligned constellation diagram, interference reconstruction and removal to acquire a second interference aligned constellation diagram.

The signal receive end re-performs channel encoding on the SEQ3 according to the ENCODER1 to acquire a code bit sequence SEQ4.

According to the modulation scheme that the interference signal transmit ends adopt to generate the interference signals, the number of bits P corresponding to one constellation point in the first interference aligned constellation diagram is determined, and every P bits in the code bit sequence SEQ4 are grouped into one bit group.

Specifically, when the interference signal transmit ends use the BPSK or QPSK modulation scheme, the number of bits P corresponding to one constellation point in the first interference aligned constellation diagram is 1 or 2. When the interference signal transmit ends use an M-QAM (M>4) modulation scheme, the number of bits P corresponding to one constellation point in the first interference aligned constellation diagram is $\log_2 M$. That is, when the signal transmit ends use 8QAM, P=3; when the signal transmit ends use 16QAM, P=4; and when the signal transmit ends use 64QAM, P=6. Then, every P bits in the code bit sequence SEQ4 are grouped into one bit group.

With respect to each bit group, in the first interference aligned constellation diagram, only constellation points corresponding to the bit group is retained to acquire the second interference aligned constellation diagram.

Figure 7:
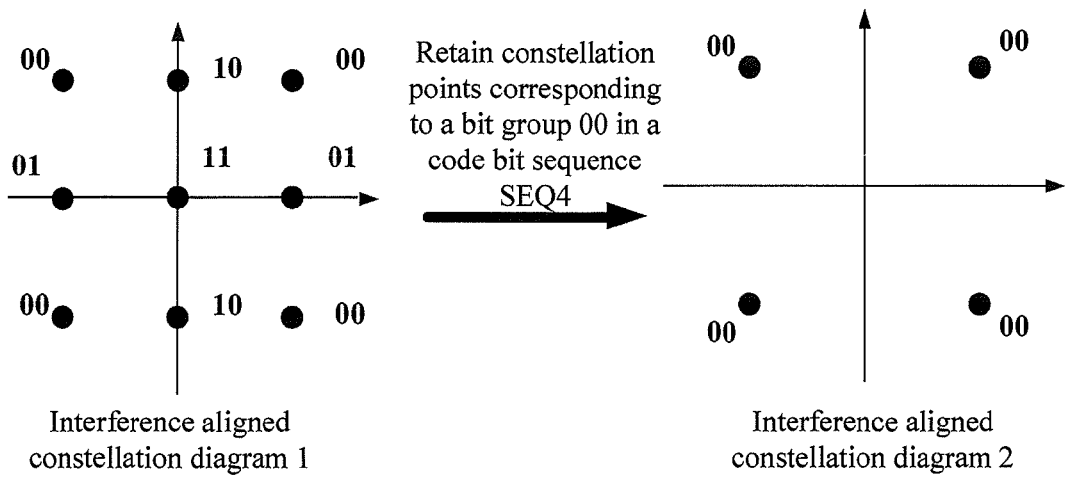
FIG. 7 is a schematic diagram illustrating generation of the second interference aligned constellation diagram according to an embodiment of the present invention.

As shown in FIG. 7, two interference signal transmit ends adopt the QPSK modulation scheme to generate the first interference aligned constellation diagram, where P=2. In this case, every two bits in the code bit sequence SEQ4 are grouped into one bit group. For example, it is assumed that the code bit sequence SEQ4 is [0000]. Two bit groups [00] and [00] are then acquired. In the first interference aligned constellation diagram, only constellation points with bits [00] corresponding to the two bit groups [00] and [00] are retained to acquire the second interference aligned constellation diagram.

It should be noted that one bit group may correspond to multiple aligned constellation points in the first interference aligned constellation diagram, that is, aligned constellation points are not unique. For example, in FIG. 7, the bit group [00] corresponds to four different aligned constellation points in the first interference aligned constellation diagram and only the four different aligned constellation points [00] are retained in the first interference aligned constellation diagram to acquire the second interference aligned constellation diagram.

When the interference signal transmit ends use an M-QAM (M>4) modulation scheme, one aligned constellation point may correspond to multiple bit groups in the first interference aligned constellation diagram. In this case, as long as one of the multiple bit groups corresponding to one aligned constellation point is the same as the foregoing $\log_2 M$ bits, the aligned constellation point is retained in the first interference aligned constellation diagram to acquire the second interference aligned constellation diagram.

309. Perform, according to the second interference aligned constellation diagram, wanted signal demodulation and decoding on the received signals SEQ1 to acquire a wanted signal SEQ6 transmitted by a transmit end.

Vector addition is performed on constellation points in the second interference aligned constellation diagram and those in the original desired constellation diagram corresponding to the wanted signal transmitted by the wanted signal transmit end to acquire constellation points; and bit mapping is determined for each constellation point to form a wanted signal constellation diagram.

Figure 8:
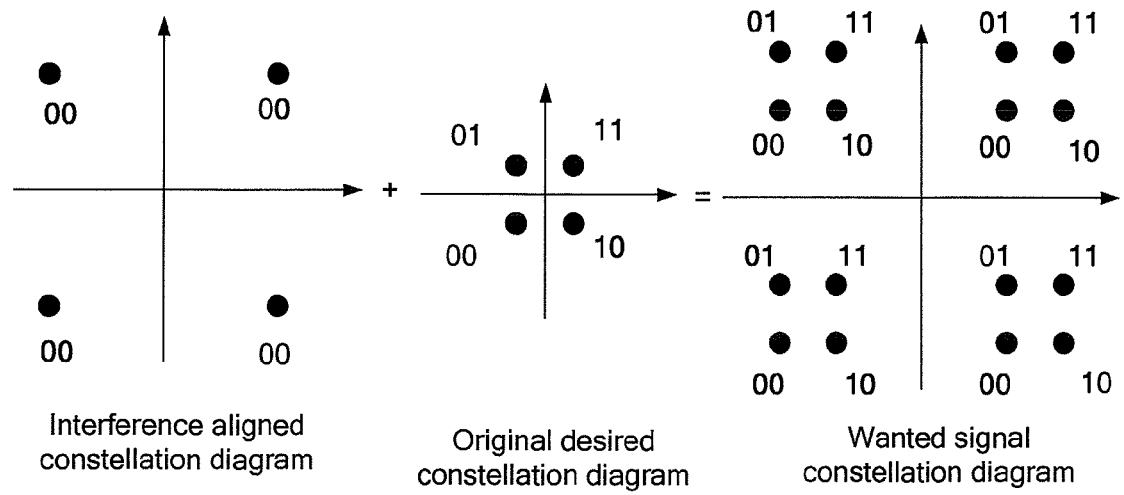
FIG. 8 is a schematic diagram illustrating generation of a wanted signal constellation diagram according to an embodiment of the present invention.

Specifically, as shown in FIG. 8, vector addition is performed on the constellation points in the second interference aligned constellation diagram and those in the original desired constellation diagram to acquire constellation points, and bit mapping is determined for each constellation point to generate the wanted signal constellation diagram. The vector addition is the same as the vector addition process for generating the first interference aligned constellation diagram, and bits corresponding to each constellation point are the same as bits corresponding to a constellation point in the original desired constellation diagram from which the constellation point is generated.

After that, wanted signal demodulation is performed on the received signal SEQ1 according to the wanted signal constellation diagram to acquire a signal bit sequence SEQ5 to be decoded. The demodulation may be hard demodulation or soft demodulation.

A channel encoding scheme ENCODER2 adopted by the wanted signal transmit end is adopted to perform channel decoding on the SEQ5 to acquire the wanted signal SEQ6 transmitted by the transmit end.

According to the interference alignment method provided by the embodiment of the present invention, multiple interference signal transmit ends perform encoding and modulation by using same channel encoding and a same modulation scheme and then a transmission parameter is adjusted to make original constellation diagrams formed for interference signals at a receive end consistent, so that the signal receive end performs demodulation and decoding step by step after aligning the interference signals and thereby removing the interference signals. Compared with the prior art where interference signals are aligned and then directly mapped to an interference source bit sequence, this reduces the complexity of signal demodulation and decoding at the receive end.

It should be noted that the embodiment is described based on a single-antenna communications system and can be easily extended to a multi-antenna system. In a multi-antenna system, the technology provided by the present invention can be used to perform interference alignment and removal on every data stream at a signal receive end.

The interference alignment method provided by the embodiment is applicable to an uplink scenario in a HetNet (heterogeneous network, Heterogeneous Network) system. When a Macro UE (macro user equipment) moves close to a Femtocell (femtocell base station), an uplink signal of the Macro UE may cause interference to an uplink of a Femto UE (femtocell user equipment) in the Femtocell. In addition, the Femtocell generally does not know on which RBs (Resource Block, resource block) the Macro UE performs transmission. In this scenario, steps of applying the interference alignment method provided by the embodiment to remove uplink interference of the Macro UE are as follows.

An uplink transmit signal of the Femto UE is divided into two data streams, which are marked as data stream 1 and data stream 2, encoded and modulated separately, and transmitted at the same time.

A Femto BS aligns a constellation diagram of data stream 1 and a constellation diagram of the Macro UE at the Femto BS according to a certain process.

When the Macro UE does not perform uplink transmission, the Femto BS can receive data stream 1 and data stream 2 at the same time.

When the Macro UE performs uplink transmission, the Femto BS considers data stream 1 as one interference signal, considers data stream 2 as a wanted signal, and considers uplink data of the Macro UE as another interference source, and then uses the interference alignment method provided by the embodiment to perform interference alignment on data stream 1 and the uplink signal of the Macro UE, so as to receive data in data stream 2.

An advantage of using the interference alignment method of the embodiment to remove the uplink interference of the Macro UE in this scenario is that: when uplink interference from the Macro UE exits, the Femto UE can still successfully transmit a part of data, and may not interrupt transmission of all data due to interference removal.

Figure 9:
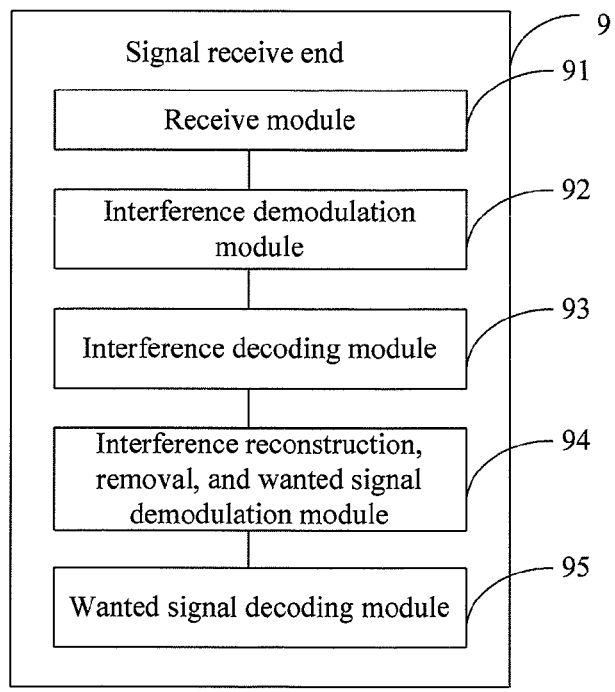
FIG. 9 is a schematic structural diagram of a signal receive end provided by an embodiment of the present invention.

An embodiment of the present invention further provides a signal receive end, where the signal receive end may be a base station such as a femtocell base station in the foregoing communication system or may be a device serving as a base station in a communications system. As shown in FIG. 9, the signal receive end 9 includes:

a receive module 91, configured to receive a signal sequence SEQ1 transmitted by transmit ends, where the signal sequence SEQ1 include interference signals and a wanted signal;

an interference demodulation module 92, configured to align original constellation diagrams corresponding to the interference signals to generate a first interference aligned constellation diagram, and perform, according to the first interference alignment constellation diagram, interference signal demodulation on the received signals SEQ1 to acquire an interference code bit sequence SEQ2;

an interference decoding module 93, configured to decode the interference code bit sequence SEQ2 to acquire an interference source bit sequence;

an interference reconstruction, removal, and wanted signal demodulation module 94, configured to perform, according to the interference source bit sequence SEQ2 and the first interference aligned constellation diagram, interference reconstruction and removal to acquire a second interference aligned constellation diagram, and perform, according to the second interference aligned constellation diagram, wanted signal demodulation on the received signals SEQ1; and a wanted signal decoding module 95, configured to decode the demodulated wanted signal to acquire a wanted signal SEQ6 transmitted by a transmit end.

Figure 10:
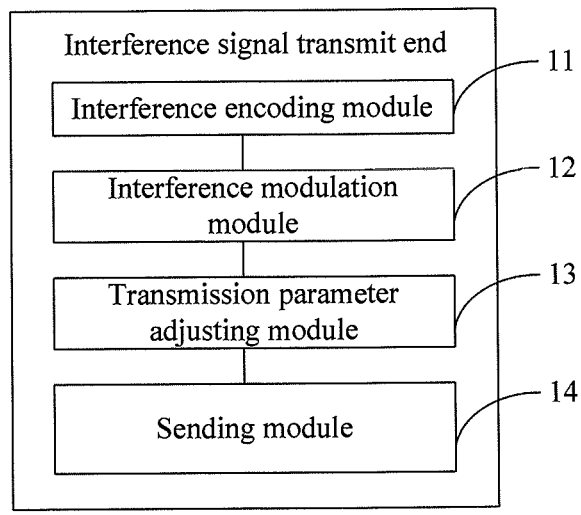
FIG. 10 is a schematic structural diagram of an interference signal transmit end provided by an embodiment of the present invention.

An embodiment of the present invention further provides an interference signal transmit end. As shown in FIG. 10, the interference signal transmit end includes:

an interference encoding module 11, configured to encode interference source bit sequence of a same length to acquire interference signal code bit sequences;

an interference modulation module 12, configured to modulate the interference signal code bit sequences of a same length to generate interference signals;

a transmission parameter adjusting module 13, configured to adjust a transmission parameter of the interference signals, so that original constellation diagrams formed for the interference signals at a receive end are consistent; and a sending module 14, configured to send the interference signals with the transmission parameter adjusted to the signal receive end.

Figure 11:
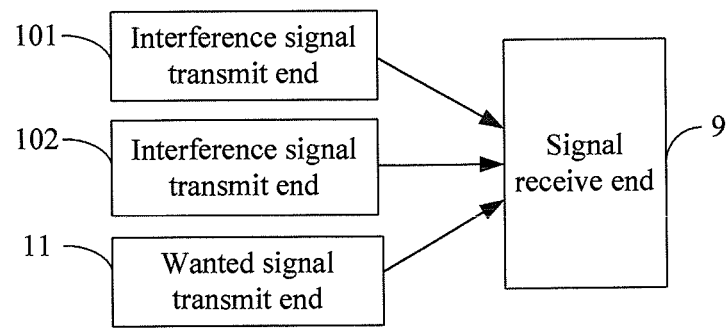
FIG. 11 is a schematic structural diagram of an interference alignment system provided by an embodiment of the present invention.

An embodiment of the present invention further provides an interference alignment system. As shown in FIG. 11, the system includes:

a signal receive end 9, configured to align all received interference signals, and then demodulate, decode, and remove the interference signals to acquire a wanted signal;

at least two interference signal transmit ends, configured to generate interference signals by using same channel encoding and a same modulation scheme, and transmit the interference signals to a signal receive end;

where, the embodiment includes two interference signal transmit ends 101 and 102; and a wanted signal transmit end 11, configured to generate the wanted signal and transit the wanted signal to the signal receive end.

The signal transmit end or signal receive end device in the embodiment of the present invention can execute the steps in the preceding method embodiments to complete functions of the method embodiments. In an application process thereof, the interference alignment method is implemented according to the descriptions in the method embodiments.

What is claimed is:

1. An interference alignment method, comprising:

receiving signals transmitted by transmit ends, wherein the signals comprise interference signals and a wanted signal;

aligning original constellation diagrams corresponding to the multiple interference signals transmitted by interference signal transmit ends, to acquire a first interference aligned constellation diagram, wherein the multiple interference signals use same channel encoding and a same modulation scheme;

performing, according to the first interference aligned constellation diagram, interference signal demodulation on the received signals to acquire an interference code bit sequence;

decoding the interference code bit sequence to acquire an interference source bit sequence;

performing, according to the interference source bit sequence and the first interference aligned constellation diagram, interference reconstruction and removal to acquire a second interference aligned constellation diagram; and performing, according to the second interference aligned constellation diagram, wanted signal demodulation and decoding on the received signals to acquire the wanted signal transmitted by a wanted signal transmit end.

2. The method according to claim 1, wherein:

aligning original constellation diagrams corresponding to the multiple interference signals transmitted by interference signal transmit ends, to acquire a first interference aligned constellation diagram comprises:

performing vector addition on original constellation points in the original constellation diagrams to acquire aligned constellation points; and determining bit mapping for each aligned constellation point to acquire the first interference aligned constellation diagram, wherein:

the bit mapping is initial bit mapping, wherein the initial bit mapping means that bits of each aligned constellation point is an exclusive-OR result of bits of an original constellation point from which the aligned constellation point is generated, and is used when a modulation scheme used by the interference signal transmit ends makes initial bit mapping of the aligned constellation points unique; or the bit mapping is final bit mapping, wherein the final bit mapping means that an exclusive-OR operation is performed on bits of original constellation points corresponding to N different combination modes of the original constellation points from which the same aligned constellation point is generated, and bit mapping of the constellation point is to average N types of initial bit mapping by bit, that is, C=(C1+C2+ . . . +CN)/N, wherein "+" means adding up values on corresponding bits in the types of N initial bit mapping C1, C2, . . . , CN to acquire a sum value on the corresponding bits and "/N" means dividing the sum value on the bits by N; and the final bit mapping is used when the modulation scheme used by the interference signal transmit ends makes the initial bit mapping of the aligned constellation points not unique.

3. The method according to claim 1, wherein performing, according to the first interference aligned constellation diagram, interference signal demodulation on the received signals to acquire an interference code bit sequence comprises:

demodulating, according to the first interference aligned constellation diagram, the received signals to acquire an interference code bit sequence;

or performing vector addition on constellation points in an original desired constellation diagram corresponding to the wanted signal transmitted by the wanted signal transmit end and those in the first interference aligned constellation diagram to acquire constellation points; determining bit mapping for each constellation point to form an interference demodulation constellation diagram; and demodulating, according to the interference demodulation constellation diagram, the received signals to acquire an interference code bit sequence.

4. The method according to claim 1, wherein performing, according to the interference source bit sequence and the first interference aligned constellation diagram, interference reconstruction and removal to acquire a second interference aligned constellation diagram comprises:

re-encoding the interference source bit sequence to acquire a code bit sequence;

determining, according to the modulation scheme adopted by the interference signal transmit ends, the number of bits P corresponding to one constellation point in the first interference aligned constellation diagram, and grouping every P bits in the code bit sequence into one bit group;

retaining only constellation points corresponding to the bit group in the first interference aligned constellation diagram; and determining bit mapping for each constellation point to form the second interference aligned constellation diagram.

5. The method according to claim 1, wherein performing, according to the second interference aligned constellation diagram, wanted signal demodulation and decoding on the received signals to acquire the wanted signal transmitted by a wanted signal transmit end comprises:

performing vector addition on constellation points in the second interference aligned constellation diagram and those in an original desired constellation diagram corresponding to the wanted signal transmitted by the wanted signal transmit end to acquire constellation points;

determining bit mapping for each constellation point to form a wanted signal constellation diagram; and performing, according to the wanted signal constellation diagram, wanted signal demodulation and decoding on the received signals to acquire the wanted signal transmitted by the transmit end.

6. An interference alignment method, comprising:

encoding and modulating, by interference signal transmit ends, interference source bit sequence of a same length by using same channel encoding and a same modulation scheme;

adjusting a transmission parameter of interference signals, so that original constellation diagrams formed for the transmitted interference signals at a signal receive end are consistent; and transmitting the interference signals to the signal receive end;

wherein, the interference signals have a same phase and a same power.

7. The method according to claim 6, wherein encoding and modulating, by interference signal transmit ends, interference source bit sequence of a same length by using same channel encoding and a same modulation scheme comprises:

encoding and modulating, by interference signal transmit ends, interference source bit sequence of a same length by using channel encoding meeting a predefined condition and a same modulation scheme, and transmitting their respective interference signals; and wherein, the predefined condition is:

if binary code bit streams generated after two binary signal source bit streams a1, a2, a3, . . . aM and b1, b2, b3, . . . , bM are processed by using a Channel Encoder 1 are respectively p1, p2, P3, . . . , pN and q1, q2, q3, . . . , qN, a binary code bit stream generated after a binary source bit stream a1⊕b1, a2⊕b2, a3⊕b3, . . . , aM⊕bM is processed by using the Channel Encoder 1 is p1 q1, p2⊕q2, p3⊕q3, . . . , pM⊕qM, wherein ⊕ indicates a binary exclusive-OR operation.

8. A signal receive end, comprising:

a receive module, configured to receive signals transmitted by transmit ends, wherein the signals comprise interference signals and a wanted signal;

an interference demodulation module, configured to align original constellation diagrams corresponding to the interference signals to generate a first interference aligned constellation diagram, and perform, according to the first interference aligned constellation diagram, interference signal demodulation on the received signals to acquire an interference code bit sequence;

an interference decoding module, configured to decode the interference code bit sequence to acquire an interference signal source bit sequence;

an interference reconstruction, removal, and wanted signal demodulation module, configured to perform, according to the interference source bit sequence and the first interference aligned constellation diagram, interference reconstruction and removal to acquire a second interference aligned constellation diagram, and perform, according to the second interference aligned constellation diagram, wanted signal demodulation on the received signals; and a wanted signal decoding module, configured to decode the demodulated wanted signal to acquire the wanted signal transmitted by a transmit end.

9. The signal receive end according to claim 8, wherein:

the interference demodulation module is further configured to perform vector addition on original constellation points in the original constellation diagrams to acquire aligned constellation points, and determine bit mapping for each aligned constellation point to acquire the first interference aligned constellation diagram, wherein:

the bit mapping is initial bit mapping, wherein the initial bit mapping means that bits of each aligned constellation point is an exclusive-OR result of bits of an original constellation point from which the aligned constellation point is generated, and is used when a modulation scheme used by the interference signal transmit ends makes initial bit mapping of the aligned constellation points unique; or the bit mapping is final bit mapping, wherein the final bit mapping means that an exclusive-OR operation is performed on bits of original constellation points corresponding to N different combination modes of the original constellation points from which the same aligned constellation point is generated, and bit mapping of the constellation point is to average N types of initial bit mapping by bit, that is, $C=(C1+C2+ \ldots +CN)/N$, wherein "+" means adding up values on corresponding bits in the types of N initial bit mapping C1, C2, ..., CN to acquire a sum value on the corresponding bits and "/N" means dividing the sum value on the bits by N; and the final bit mapping is used when the modulation scheme used by the interference signal transmit ends makes the initial bit mapping of the aligned constellation points not unique.

10. The signal receive end according to claim 8, wherein the interference demodulation module is further configured to:
   demodulate, according to the first interference aligned constellation diagram, the received signals to acquire an interference code bit sequence; or
   perform vector addition on constellation points in an original desired constellation diagram corresponding to the wanted signal transmitted by the wanted signal transmit end and those in the first interference aligned constellation diagram to acquire constellation points; determine bit mapping for each constellation point to form an interference demodulation constellation diagram; and
   demodulate, according to the interference demodulation constellation diagram, the received signals to acquire an interference code bit sequence.

11. The signal receive end according to claim 8, wherein the interference reconstruction, removal, and wanted signal demodulation module is further configured to:
   re-encode the interference source bit sequence to acquire a code bit sequence;
   determine, according to the modulation scheme adopted by the interference signal transmit ends, the number of bits P corresponding to one constellation point in the first interference aligned constellation diagram, and grouping every P bits in the code bit sequence into one bit group; and
   retain only constellation points corresponding to the bit group in the first interference aligned constellation diagram, and determining bit mapping for each constellation point to form the second interference aligned constellation diagram.

12. The signal receive end according to claim 8, wherein the wanted signal decoding module is further configured to:
   perform vector addition on constellation points in the second interference aligned constellation diagram and those in an original desired constellation diagram corresponding to the wanted signal transmitted by the wanted signal transmit end to acquire constellation points;
   determine bit mapping for each constellation point to form a wanted signal constellation diagram; and
   perform, according to the wanted signal constellation diagram, wanted signal demodulation and decoding on the received signals to acquire the wanted signal transmitted by the transmit end.

13. An interference signal transmit end, comprising:
   an interference encoding module, configured to encode interference source bit sequence of a same length to acquire interference signal code bit sequences;
   an interference modulation module, configured to modulate the interference signal code bit sequences of a same length to generate interference signals;
   a transmission parameter adjusting module, configured to adjust a transmission parameter of the interference signals, so that original constellation diagrams formed for the interference signals at a receive end are consistent; and
   a sending module, configured to send the interference signals with the transmission parameter adjusted to the signal receive end;
   wherein, the interference signals have a same phase and a same power.

14. The signal receive end according to claim 13, wherein:
   the interference encoding module is further configured to:
   encode, by interference signal transmit ends, interference source bit sequence of a same length by using channel encoding meeting a predefined condition, and
   transmit their respective interference signals; and
   wherein, the predefined condition is:
   if binary code bit streams generated after two binary signal source bit streams a1, a2, a3, ..., aM and b1, b2, b3, ..., bM are processed by using a Channel Encoder 1 are respectively p1, p2, p3, ..., pN and q1, q2, q3, ..., qN, a binary code bit stream generated after a binary source bit stream a1⊕b1, a2⊕b2, a3⊕b3, ..., aM⊕bM is processed by using the Channel Encoder 1 is p1⊕q1, p2⊕q2, p3⊕q3, ..., pM⊕qM, wherein ⊕ indicates a binary exclusive-OR operation.

\* \* \* \* \*